(12) United States Patent
Quaglino, Jr.

(10) Patent No.: US 8,404,122 B1
(45) Date of Patent: Mar. 26, 2013

(54) OIL RECOVERY SYSTEM AND METHOD

(75) Inventor: Angelo Quaglino, Jr., Chalmette, LA (US)

(73) Assignee: Angelo V. Quaglino, III, Chalmette, LA (US)

( * ) Notice: Subject to any disclaimer, the term of this patent is extended or adjusted under 35 U.S.C. 154(b) by 257 days.

(21) Appl. No.: 12/905,631

(22) Filed: Oct. 15, 2010

Related U.S. Application Data

(60) Provisional application No. 61/348,830, filed on May 27, 2010.

(51) Int. Cl.
*E02B 15/04* (2006.01)
(52) U.S. Cl. ............... 210/747.5; 210/776; 210/170.11; 210/242.3; 210/923
(58) Field of Classification Search ............... 210/747.5, 210/747.6, 776, 170.05, 170.09, 170.11, 210/242.3, 923; 405/60
See application file for complete search history.

(56) References Cited

U.S. PATENT DOCUMENTS

| 3,500,841 | A | * | 3/1970 | Logan | 210/923 |
| 3,653,215 | A | * | 4/1972 | Crucet | 405/60 |
| 3,674,150 | A | * | 7/1972 | Lejeune | 210/923 |
| 3,724,662 | A | * | 4/1973 | Ortiz | 210/242.3 |
| 3,784,013 | A | * | 1/1974 | Daniel | 210/242.3 |
| 4,395,157 | A | * | 7/1983 | Cunningham | 405/60 |
| 4,449,850 | A | * | 5/1984 | Cessou et al. | 210/923 |
| 4,531,860 | A | * | 7/1985 | Barnett | 210/923 |
| 4,790,936 | A | * | 12/1988 | Renfrow | 210/242.3 |
| 7,182,860 | B2 | * | 2/2007 | Lundin | 210/242.3 |

* cited by examiner

*Primary Examiner* — Christopher Upton
(74) *Attorney, Agent, or Firm* — Garvey, Smith, Nehrbass & North, L.L.C.; Gregory C. Smith; Julia M. FitzPatrick

(57) ABSTRACT

A system and a method for collecting oil from the surface of a body of water, which includes a vessel for receiving oil being collected; an articulating arm, having a first end secured to the vessel and a second end extending above the body of water; an oil collection portion, comprising a funnel shaped member suspended from the second end of the articulating arm, the funnel shaped member having a large opening at is lower end, and an angulated wall portion terminating in a small apex at the upper end of the funnel shaped member; a pump secured to and communicating with the apex end of the funnel shaped member, having a float switch to activate the pump; a line extending from the pump to the interior of the vessel, so that when the funnel shaped member is lowered into the water, oil floating on the water will become more concentrated as the oil is moved from the large opening of the funnel to the apex of the funnel, and when the oil contacts the float switch the pump pumps the oil from atop the water to the interior of the vessel.

14 Claims, 5 Drawing Sheets

OIL RECOVERY SYSTEM AND METHOD

CROSS-REFERENCE TO RELATED APPLICATIONS

Priority of U.S. Provisional Patent Application Ser. No. 61/348,830, filed May 27, 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The system and method of the present invention relates to oil recovery operations in a body of water. More particularly, the present invention relates to a system for siphoning oil from the surface of a body of water into a container vessel while the oil is sitting atop the water. The present invention also relates to a system for recovering oil spilled into a body of water by concentrating the oil within a confined space, and siphoning the oil from the upper portion of the confined space, into a waiting barge or the like vessel.

2. General Background

One of the more difficult problems in the oil and gas industry is drilling in bodies of water and the fear that a blowout would occur and the oil would leak into the body of water and endanger the environment, wildlife and human life. Of course, most recently, that event occurred exactly when a deep well owned by British Petroleum caught fire and sank and the riser pipe in which the oil was being recovered onto the rig was torn away from the rig and oil began to flow from the formation into the riser into the Gulf of Mexico at a depth of approximately 5,000 feet. That flow of oil has continued and does continue on as this application is being prepared with the oil rising through the 5,000 feet of water and reaching the surface where the oil being lighter than water floats on the water until after a certain amount of time the oil through the use of dispersants or other chemical activity become slightly heavier and begins to sink into the water and then must be recovered in another fashion.

Currently, the most common means of trying to recover the oil is to corral it in a system of booms and to set fire to the oil and oil which cannot burn or will not burn is then kept from the beaches and land and marshes until in fact it either sinks below the surface or it is in fact recovered. Therefore, there appears to be a need in the industry for a system that can recover the oil while it is still on the surface of the body of water and prior to it reaching land or prior to it gaining a certain amount of chemical formation and begin to sink into the water.

SUMMARY OF THE PRESENT INVENTION

The system of the present invention solves the problems in the art in a simple and straightforward manner. What is provided is an oil recovery system which includes a recovery ship or barge placed in the water; an articulating boom attached at its first end to the barge and attached to a recovery funnel portion on its second end. The funnel-shaped portion would be lowered onto the layer of oil where the oil would be trapped within the funnel opening. As the funnel is lowered into the water, the quantity of oil begins to move up through the angulated walls of the funnel and is eventually gathered at the apex of the funnel in a much thicker layer due to the reduced area at the funnel apex from the base of the funnel. There is provided a pump of the type which is capable of pumping oil from the funnel through a line attached to the articulating boom and to be recovered into the barge or waiting ship. In this system, once the quantity of oil is siphoned from the funnel, the funnel will then be moved to a second position and the activity would be repeated time and time again over the entire body of the layer of oil. There is further provided a float switch which is activated when the quantity of oil reaches the apex of the funnel and the float switch is activated which then triggers the operation of the pump. There is further provided a one way valve on the first end of the boom so that as the oil flows into the ship it is then prevented from flowing back into the oil line into the funnel through the closure of the one way valve.

Therefore, it is the principal object of the present invention to provide a system for recovering oil that is floating on a body of water prior to its sinking or reaching land.

It is the further principal object of the present invention to provide a device which traps a certain quantity of oil and concentrates it in the apex of the device so that it can be siphoned or pumped through a line into a waiting ship or barge.

It is a further object of the present invention to provide a system that can be moved along a body of water and patches of oil can be siphoned into a portion of the device for recovery in a ship and this process can be repeated time and time again until the entire area of oil has been retrieved from the body of water into the waiting ship.

It is a further object of the present invention to provide an oil recovery system which can be fabricated in a size so as to be able to be used in a confined space such as a bayou or small river to collect the oil.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

Figure 1:
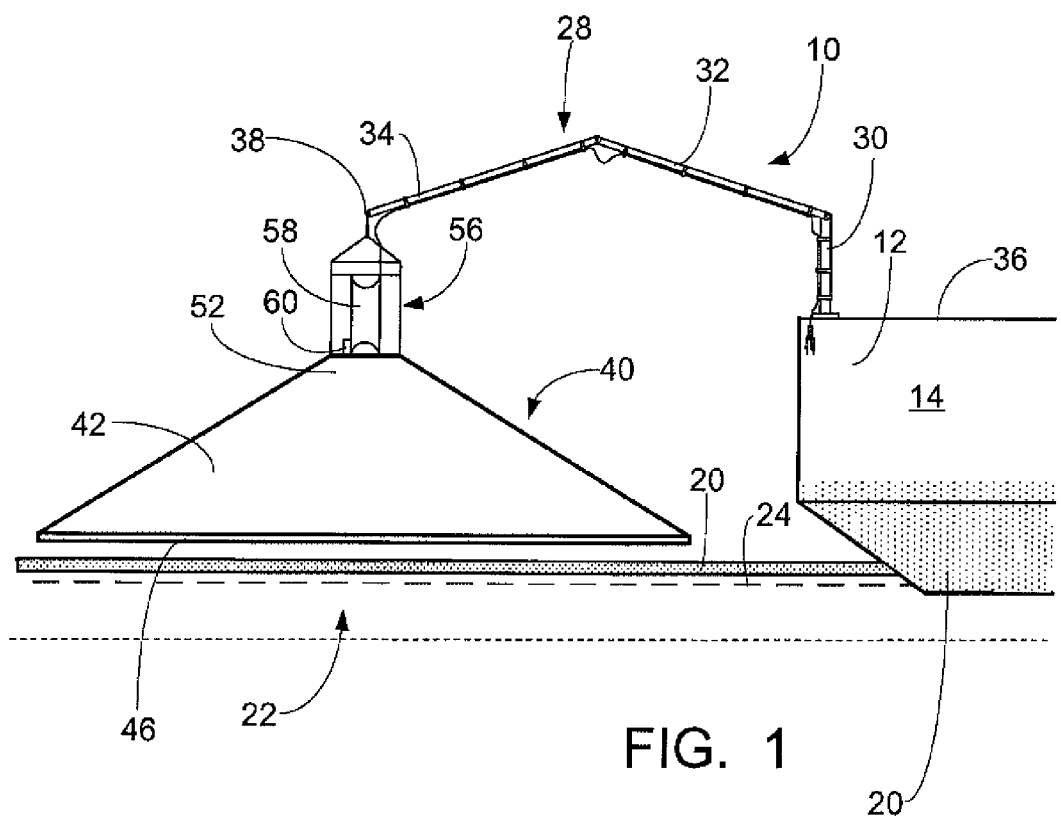
FIG. 1 is a partial view of the oil recovery system of the present invention illustrating the funnel portion hovering over the body of water containing a layer of oil.
Figure 2:
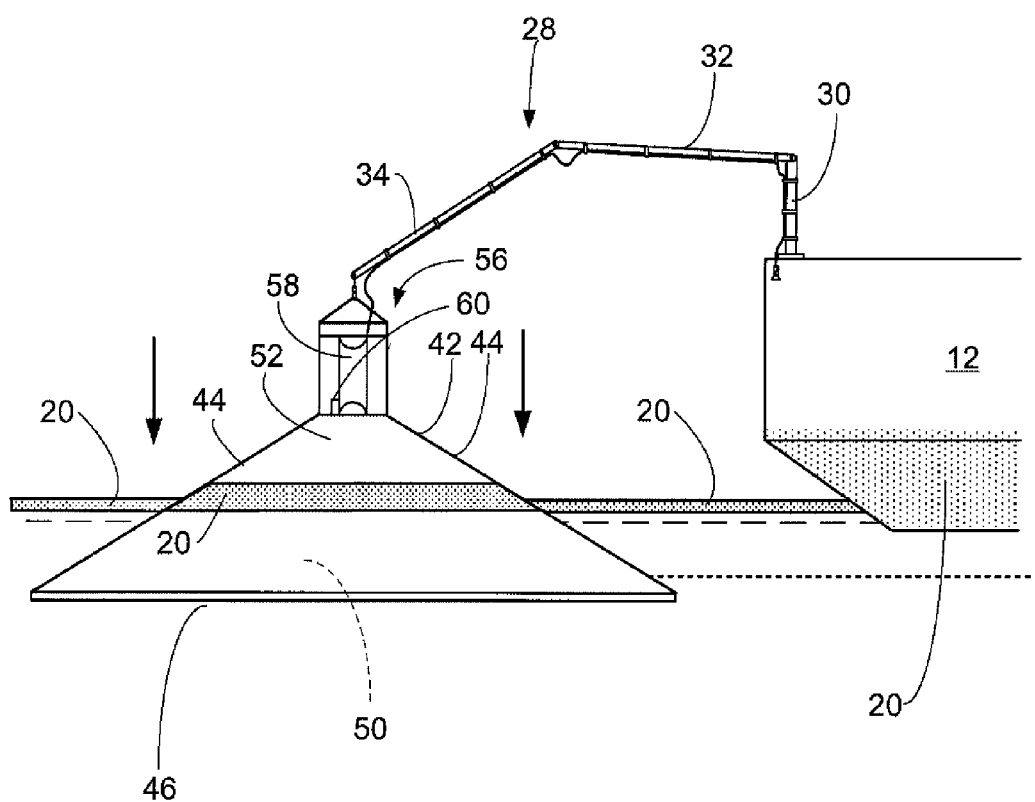
FIG. 2 is a second view as shown in FIG. 1 with the funnel portion of the system having been lowered further into the body of water so that the oil layer is being concentrated into the upper portion of the funnel.
Figure 3:
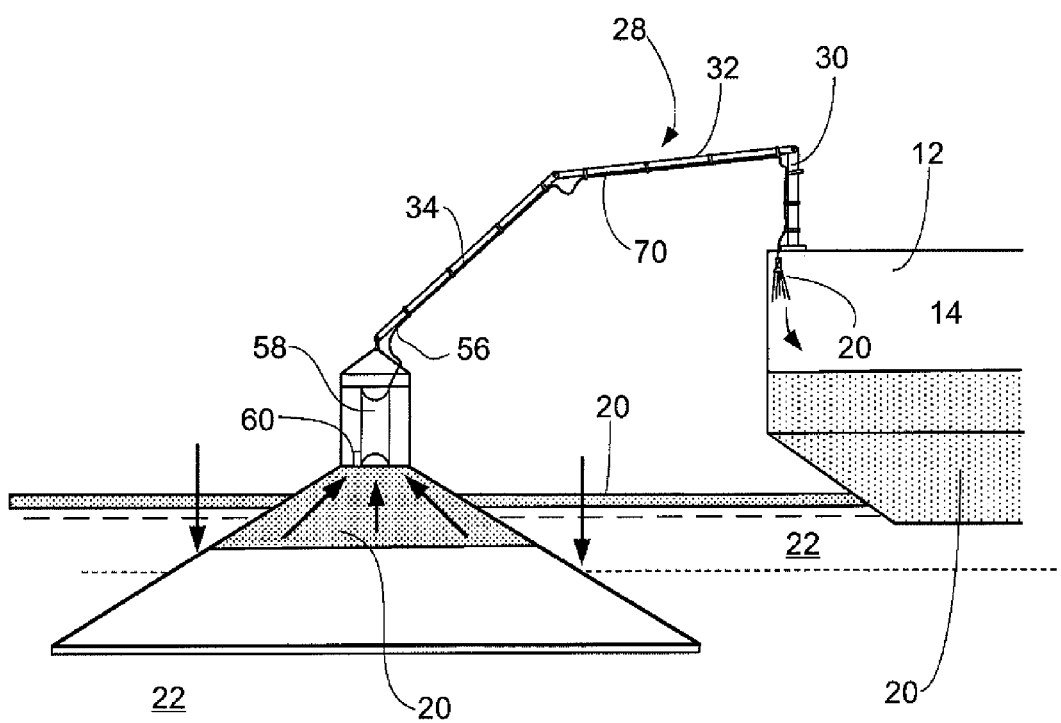
FIG. 3 illustrates yet another view of the portion of the device shown in FIG. 1 where the funnel has been placed substantially deep enough into the body of water that the oil is concentrated in the apex of the funnel to activate the pump.
Figure 4:
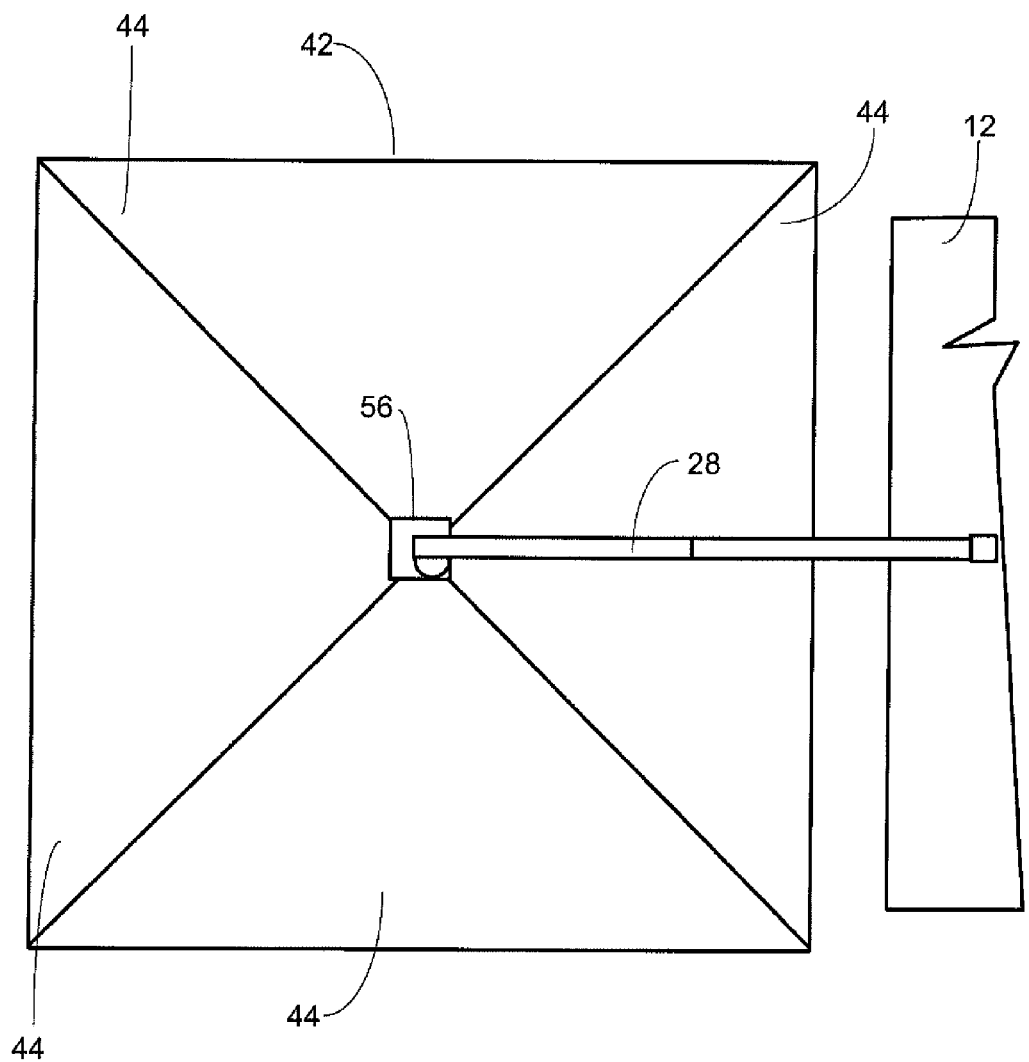
FIG. 4 is a partial top view of the funnel portion in the preferred embodiment of the system of the present invention.

FIGS. 1 through 5 illustrate the preferred embodiment of the system of the present invention by the numeral 10. What is provided first in FIG. 1 is a partial view of a waiting barge or ship 12 having a space 14 therein for holding oil 20 which is retrieved from a body of water 22. As further illustrated, the body of water of 22 contains a layer of crude oil 20, or other petroleum product, floating on the surface 24 of the water 22, which would be the case since oil 20 is lighter than water 22. The system 10 further includes an articulated arm 28 having a first arm section 30 attached to the upper wall 36 of the ship 12, a second and third articulating arms 32 and 34 where the end 38 of the third arm 34 is supporting an oil collection portion 40. The oil collection portion 40 includes a large funnel or pyramid shaped portion 42 having four angulated sidewalls 44, as seen in FIG. 4, terminating in an open bottom edge 46, which defines a large opening of the bottom edge 46 and an internal space 50 therein. Because of the angulation of the sidewalls 44, space 50 is very much wider at the bottom edge 46 that at the upper point which defines small area, referred to as the apex 52 of the space 50 of funnel portion 42. The apex 52, at the upper most end of the funnel 42, as illustrated, includes an overhead portion 56 which includes a pump 58, of the type known in the art, which would be capable of siphoning crude oil 20 or other debris type product therethrough. There would be further provided a float switch 60 related to the pump 58, the operation of which will be discussed further.

The system will operate in the manner discussed further. As seen in FIG. 2, the funnel portion 42, supported at the far end 38 of third arm 34 has been lowered into the body of water 22 and has captured a certain quantity of oil 20 therein. As seen the Figure, as the funnel 42 is lowered deeper into the water 22, because the four sidewalls 44 are angulated upward, the layer of oil 20 would move from a lower concentration of oil at the large area of the bottom edge 46 of the funnel 42 to an ever increasing smaller area toward the apex 52, where the oil 20 would become more concentrated and would become a thicker layer due to the concentration at the smaller apex portion 52 of the funnel 42.

FIG. 3 illustrates again the funnel portion 42 completely lowered into the water 22 to the level so that all of the oil 20 within the funnel 42 is concentrated at the apex 52 of the funnel 42. At that point the oil 20 would contact and trigger the float switch 60 which would then place the pump 58 into operation. The pump 58 would begin pumping the oil 20 through the pump 58 through an oil flow line 70 which is attached along the length of the articulated arm 28, and would terminate in an opening 72 leading into the storage space 14 of the barge or ship 12. This process would continue until all of the oil 20 contained within the confines of funnel 42 is pumped from the body of water 22 through the line 70 into the barge or ship opening 72 to begin filling the vessel as seen in FIG. 3.

There is also illustrated a one way valve 75 positioned at the end of the oil flow line 70 to prevent any oil which has been collected into the vessel 12 from returning through flow line 70 to the pump 58, when the pump 58 is not in operation.

In FIG. 4, it is illustrated that the funnel portion is a rectangular funnel 42 having four angulated sidewalls 44 terminating in a concentrated apex portion 52.

In the preferred embodiment the funnel portion 42 could well be a circle or any other configuration other than the four sided configuration as seen in FIG. 4. FIG. 4 also illustrates the articulated arm 28 leading from the barge 12 into the overhead portion 56 of the funnel 42 as seen in earlier figures.

Figure 5:
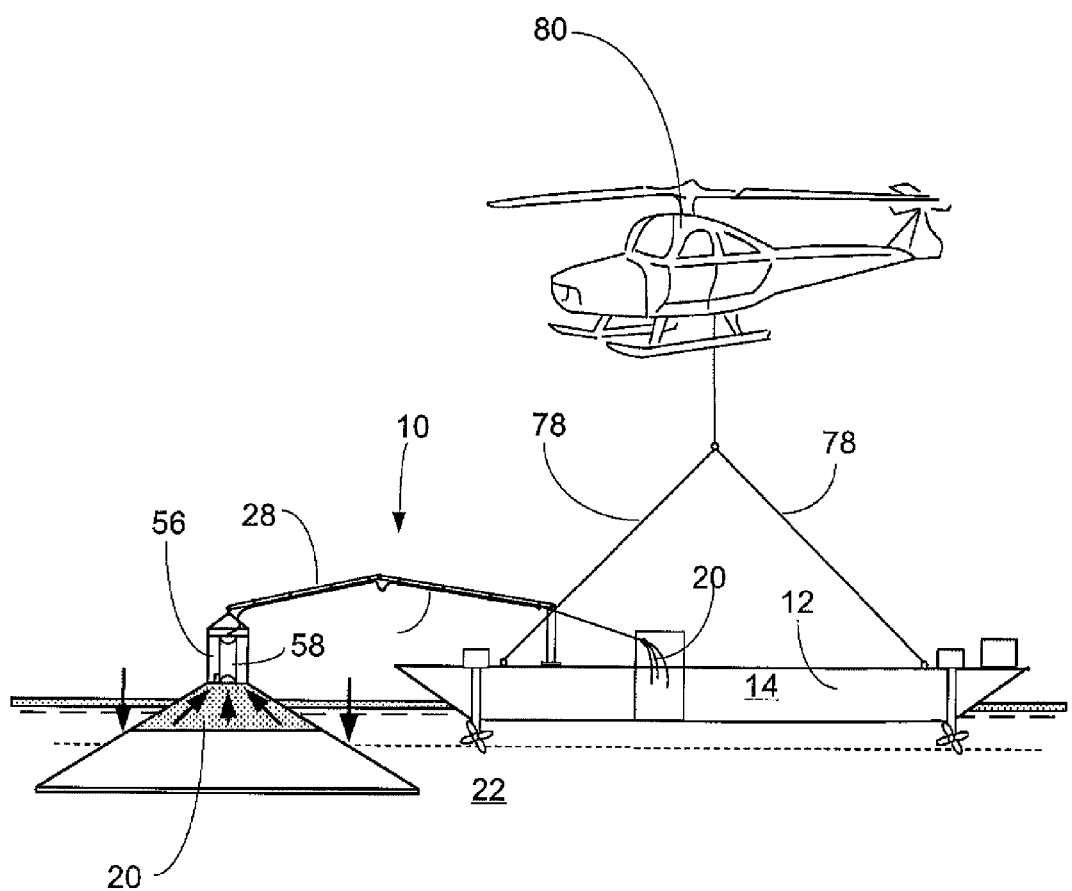
FIG. 5 illustrates an overall view of the system of the present invention where the device is in a reduced configuration so that it may be placed within a canal or smaller body of water where it can be lowered by helicopter or like into the body of water.

Turning now to FIG. 5, there is illustrated the complete system of the present invention, namely, the funnel portion 42 attached through the articulated arm 28 to a barge or ship 12. In this view, the oil 20 has been concentrated in the apex portion 52 of the funnel 42. The pump 58 was activated by the float switch 60 and the oil 20 is being pumped through the oil flow line 70 attached to the articulated arm 28 and flowing into the barge opening 72. This particular view in FIG. 5 illustrates that the barge 12 is being lowered in place at the end of lines 78 by a helicopter 80. In this particular embodiment of the system would be a much smaller type of system 10 capable of being used in canals or other small narrow bodies of water where the larger systems used in the opened waters such as the Gulf of Mexico could not fit. In this system, due to the fact that the barge 12 may not be able to reach its point where the oil is leaking, a helicopter 80 may carry it to the location and lower it in place and the oil collection activity could commence as seen in FIG. 5.

The following is a list of parts and materials suitable for use in the present invention:

| PARTS LIST | |
|---|---|
| Parts Number | Description |
| 10 | system |
| 12 | barge or ship |
| 14 | space |
| 20 | oil |
| 22 | water |
| 24 | surface |
| 28 | articulate arm |
| 30 | first arm section |
| 36 | upper wall |
| 32 | second arm |
| 34 | third arm |
| 38 | end |
| 40 | oil recovery portion |
| 42 | funnel portion |
| 44 | angulated sidewalls |
| 46 | bottom/lower edge |
| 50 | internal space |
| 52 | apex |
| 56 | overhead portion |
| 58 | pump |
| 60 | float switch |
| 70 | oil flowline |
| 72 | opening |
| 75 | one-way valve |
| 78 | lines |
| 80 | helicopter |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A system for collecting oil from the surface of a body of water, comprising:
   a. an articulating arm, having a first end secured to a base and a second end extending above the body of water;
   b. an oil collection portion, comprising a funnel shaped member with a large open end suspended from the second end of the articulating arm, and further comprising an angulated wall portion terminating in an apex at an upper end of the open funnel shaped member;

c. a line extending from a pump to an oil collection vessel, so that when the funnel shaped member is lowered into the water, oil floating on the water will become more concentrated as the oil is moved from the large open end of the funnel shaped member to the apex of the funnel shaped member; and d. said pump secured to and communicating with the apex end of the funnel shaped member to pump the oil that is concentrated at the apex of the funnel shaped member to the oil collection vessel.

2. The system in claim 1, wherein the first end of the articulating arm is mounted on the oil containment vessel.

3. The system in claim 1, further comprising a float switch which is in contact with the oil at the apex of the funnel shaped member to activate the pump.

4. The system in claim 1, wherein the funnel shaped member is rectangular, square or round in configuration.

5. The system in claim 1, wherein the overall size of the system is enlarged or reduced depending on the size of the body of water from when the oil is being collected.

6. A system for collecting oil from the surface of a body of water, comprising:

a. a vessel for receiving oil being collected;

b. an articulating arm, having a first end secured to a base and a second end extending above the body of water;

c. an oil collection portion, comprising a funnel shaped member suspended from the second end of the articulating arm, the funnel shaped member having a large opening at is lower end, and an angulated wall portion terminating in a small apex at the upper end of the funnel shaped member;

d. a pump secured to and communicating with the apex end of the funnel shaped member, having a float switch to activate the pump;

e. a line extending from the pump to the interior of the vessel, so that when the funnel shaped member is lowered into the water, oil floating on the water will become more concentrated as the oil is moved from the large opening of the funnel shaped member to the apex of the funnel shaped member, and when the oil contacts the float switch the pump pumps the oil from atop the water to the interior of the vessel.

7. The system in claim 6, wherein the funnel shaped member is rectangular, square or round in configuration.

8. The system in claim 6, wherein the overall size of the system is enlarged or reduced depending on the size of the body of water from when the oil is being collected.

9. The system in claim 6, wherein the oil collection system is mounted on the vessel to collect the oil or on a separate vessel or platform.

10. A method of collecting an oil spill from the surface of a body of water, comprising the following steps:

a. providing an articulating arm, having a first end secured to a base and a second end extending above the body of water;

b. suspending an oil collection portion from the second end of the articulating arm, having a large opening at is lower end, and an angulated wall portion terminating in a small apex at the upper end of the oil collection portion;

c. mounting a pump to the oil collection portion that communicates with the apex;

d. providing an oil collection vessel;

e. extending a line from the pump to the oil collection vessel;

f. lowering the oil collection portion into the water, and trapping a quantity of oil floating on the water within the oil collection portion;

g. continuing to lower the oil collection portion deeper into the water to a point that the trapped oil reaches the apex of the oil collection portion; and h. pumping the oil trapped in or near the apex of the oil collection member to the oil containment vessel.

11. The method in claim 10, wherein the method would be repeated until all of the oil is collected from the water and transported to the vessel.

12. The method in claim 10, wherein the oil collection portion suspended from the second end of the articulating arm, with a large opening at the lower end, and an angulated wall portion terminating in the small apex at the upper end defines a funnel shaped member.

13. The method in claim 10, wherein the pump is activated by a float switch when the oil collected in or near the apex makes contact with the switch.

14. A method of collecting an oil spill from the surface of a body of water, comprising the following steps:

a. providing a vessel for receiving oil being collected;

b. providing an articulating arm, having a first end secured to the vessel and a second end extending above the body of water;

c. suspending an oil collection portion from the second end of the articulating arm, comprising a funnel shaped member suspended from the second end of the articulating arm, and having a large opening at is lower end, and an angulated wall portion terminating in a small apex at the upper end of the funnel shaped member;

d. mounting a pump to the funnel shaped member that communicates with the apex end of the funnel shaped member, having a float switch to activate the pump;

e. extending a line from the pump to the interior of the vessel;

f. lowering the funnel shaped member into the water, and trapping a quantity of oil floating on the water within the funnel;

g. continuing to lower the funnel shaped member deeper into the water to a point that the trapped oil at the apex of the funnel shaped member contacts the float switch to activate the pump; and h. pumping the oil from the apex of the funnel shaped member to the interior of the vessel.

\* \* \* \* \*